United States Patent
Lee

(10) Patent No.: US 7,385,430 B2
(45) Date of Patent: Jun. 10, 2008

(54) DATA OUTPUT CLOCK GENERATING CIRCUIT AND METHOD OF GENERATING DATA OUTPUT CLOCK OF SEMICONDUCTOR MEMORY APPARATUS

(75) Inventor: Geun-Il Lee, Gyeonggi-do (KR)

(73) Assignee: Hynix Semiconductor Inc. (KR)

( * ) Notice: Subject to any disclaimer, the term of this patent is extended or adjusted under 35 U.S.C. 154(b) by 0 days.

(21) Appl. No.: 11/592,308

(22) Filed: Nov. 3, 2006

(65) Prior Publication Data

US 2007/0146040 A1 Jun. 28, 2007

(30) Foreign Application Priority Data

Dec. 27, 2005 (KR) ............... 10-2005-0130436

(51) Int. Cl.
*G06F 1/04* (2006.01)
*H03K 3/00* (2006.01)

(52) U.S. Cl. .................. 327/291; 327/295; 327/296

(58) Field of Classification Search ........... 327/291, 327/292, 298, 164–166, 170, 185, 199–201, 327/295, 296
See application file for complete search history.

(56) References Cited

U.S. PATENT DOCUMENTS

| 6,181,174 | B1 * | 1/2001 | Fujieda et al. ........... 327/158 |
| 6,448,828 | B2 * | 9/2002 | Stark et al. ............... 327/175 |
| 6,720,807 | B1 * | 4/2004 | Kubo et al. .............. 327/141 |
| 6,768,698 | B2 | 7/2004 | Kono |
| 6,822,497 | B1 * | 11/2004 | Yao et al. ................. 327/291 |
| 6,954,097 | B2 | 10/2005 | Harrison |
| 6,977,605 | B2 | 12/2005 | Lee et al. |
| 6,982,578 | B2 | 1/2006 | Lee |
| 7,081,784 | B2 * | 7/2006 | Kang ....................... 327/291 |
| 2004/0080348 | A1 | 4/2004 | Kubo et al. |
| 2006/0001468 | A1 * | 1/2006 | Siegler et al. ........... 327/291 |

FOREIGN PATENT DOCUMENTS

JP 2000022530 A 1/2000

* cited by examiner

*Primary Examiner*—Tuan T. Lam
*Assistant Examiner*—Diana J Cheng
(74) *Attorney, Agent, or Firm*—Venable LLP; Jeffri A. Kaminski

(57) ABSTRACT

A data output clock generating circuit for a semiconductor memory apparatus includes a rising data output clock generating unit which combines a rising clock with a signal to be generated in response to a rising output enable signal and a falling clock to generate a rising data output clock, and a falling data output clock generating unit which combines the falling clock with a signal to be generated in response to a falling output enable signal and the rising clock to generate a falling data output clock.

12 Claims, 5 Drawing Sheets

DATA OUTPUT CLOCK GENERATING CIRCUIT AND METHOD OF GENERATING DATA OUTPUT CLOCK OF SEMICONDUCTOR MEMORY APPARATUS

BACKGROUND

1. Technical Field

The present invention relates to a data output clock generating circuit and a method of generating a data output clock of a semiconductor memory apparatus. In particular, the present invention relates to a data output clock generating circuit for a semiconductor memory apparatus, which can stably generate a data output clock to be used for data output in a semiconductor memory apparatus, and to a method of generating a data output clock for a semiconductor memory apparatus.

2. Related Art

In general, a data input/output operation of an SDRAM (Synchronous Dynamic RAM) is performed in synchronization with a rising edge of a clock. However, in a DDR SDRAM (Double Data Rate SDRAM), a data input/output operation is performed in synchronization with a rising edge and a falling edge of a clock using an internal DLL (Delay Locked Loop) circuit. Accordingly, the DDR SDRAM has a data input/output speed twice as large as the SDRAM. Therefore, a high-speed semiconductor memory apparatus such as the DDR SDRAM generates a clock (hereinafter, referred to as 'rising clock'), which is enabled at the time of a rising edge of the clock output from the DLL circuit, and a clock (hereinafter, referred to as 'falling clock'), which is enabled at the time of a falling edge of the clock output from the DLL circuit, for data output during a read operation. At this time, a data output clock generator generates a rising data output clock and a falling data output clock using an output enable signal, together with the rising clock and the falling clock, and transmits the generated rising data output clock and the generated falling data output clock to data output buffers, such that a data output operation is performed.

A data output clock generating circuit according to the related art will now be described with reference to FIGS. 1 to 3.

FIG. 1 is a block diagram illustrating a data output process of a general semiconductor memory apparatus. In this example the semiconductor memory apparatus has 16 data output buffers.

Referring to FIG. 1, an output enable signal generator 10 generates a rising output enable signal roe and a falling output enable signal foe. A data output clock generator 20 receives the rising output enable signal roe and the falling output enable signal foe, together with a rising clock rclk and a falling clock fclk transmitted from a DLL circuit and generates a rising data output clock rclk_do and a falling data output clock fclk_do. Sixteen data output buffers 30 individually receive the rising data output clock rclk_do and the falling data output clock fclk_do output from the data output clock generator 20, and perform the data output operation. The number of the data output buffers 30 differs between semiconductor memory apparatuses, and is not limited to the configuration shown in the drawing.

In order to output data at the time of the rising edge of the DLL clock, the output enable signal generator 10 generates the rising output enable signal roe, which is changed in synchronization with the falling clock fclk, and transmits the generated rising output enable signal roe to the data output clock generator 20. Then, the data output clock generator 20 generates the rising data output clock rclk_do from the rising clock rclk transmitted from the DLL circuit and the rising output enable signal roe, and transmits the generated rising data output clock rclk_do to the 16 data output buffers 30. Each of the data output buffers 30 outputs rising data by the number of bits corresponding to the length of the input rising data output clock rclk_do.

Similarly, in order to output data at the time of the falling edge of the DLL clock, the output enable signal generator 10 generates the falling output enable signal foe, which is changed in synchronization with the rising clock rclk, and transmits the generated falling output enable signal foe to the data output clock generator 20. Then, the data output clock generator 20 generates the falling data output clock fclk_do from the falling clock fclk transmitted from the DLL circuit and the falling output enable signal foe, and transmits the generated falling data output clock fclk_do to the 16 data output buffers 30. Each of the data output buffers 30 outputs falling data by the number of bits corresponding to the length of the input falling data output clock fclk_do.

FIG. 2 is a diagram showing the internal configuration of the clock generator shown in FIG. 1.

As shown in FIG. 2, the data output clock generator 20 has a rising data output clock generating unit 210 which receives the rising output enable signal roe and the rising clock rclk and generates the rising data output clock rclk_do, and a falling data output clock generating unit 220 which receives the falling output enable signal foe and the falling clock fclk and generates the falling data output clock fclk_do.

The rising data output clock generating unit 210 and the falling data output clock generating unit 220 each have a NAND gate 212, 222 and an inverter 214, 224.

With this configuration, in the rising data output clock generating unit 210, when the rising output enable signal roe is enabled, the input rising clock rclk is output as the rising data output clock rclk_do. Similarly, in the falling data output clock generating unit 220, when the falling output enable signal foe is enabled, the input falling clock fclk is output as the falling data output clock fclk_do.

FIG. 3 is a timing diagram illustrating a data output process of the semiconductor memory apparatus according to the related art. In FIG. 3, for example, 8-bit data is output by the data output clock.

Referring to FIG. 3, it should be understood that the rising clock rclk is generated at the time of the rising edge of the DLL clock dll_clk and the falling clock fclk is generated at the time of the falling edge of the DLL clock dll_clk. Furthermore, it can be understood that the falling output enable signal foe is generated by the rising clock rclk, and the rising output enable signal roe is generated by the falling clock fclk. The rising data output clock rclk_do is the rising clock rclk extracted when the rising output enable signal roe is enabled. Similarly, the falling data output clock fclk_do is the falling clock fclk extracted when the falling output enable signal foe is enabled.

In a low-speed semiconductor memory apparatus, the generation of the data output clocks rclk_do and fclk_do according to the above-described configuration does not cause any problems. In a high-speed semiconductor memory apparatus, however, as the frequency of the DLL clock dll_clk becomes high, a timing margin between the rising output enable signal roe and the rising clock rclk, and a timing margin between the falling output enable signal foe and the falling clock-fclk are decreased. In order to output 8-bit data, the rising data output clock rclk_do and the falling data output clock flck_do need to have four cycles.

Accordingly, the rising output enable signal roe and the falling output enable signal foe need to be enabled in a period of four or more cycles of the rising clock rclk and the falling clock fclk, respectively. However, if the enable periods of the rising output enable signal roe and the falling output enable signal foe are decreased due to the decrease in the timing margin, a data output clock clk do may not have four cycles, and thus 8-bit data may be not obtained. That is, in the high-speed semiconductor memory apparatus, the rising data output clock rclk_do and the falling data output clock fclk_do may be improper due to the decrease in the timing margin between the rising output enable signal roe and the rising clock rclk and between the falling output enable signal foe and the falling clock fclk. Accordingly, an erroneous data output operation may occur.

SUMMARY

Embodiments of the present invention has been proposed in order to solve the above-described problems. An exemplary embodiment of the present invention provides a data output clock generating circuit for a semiconductor memory apparatus which can increase timing margins between a rising output enable signal and a rising clock and between a falling output enable signal and a falling clock when data is output in a high-speed semiconductor memory apparatus so as to stably generate a rising data output clock and a falling data output clock to be used for a data output operation, and a method of generating a data output clock for a semiconductor memory apparatus.

According to an embodiment of the present invention, a data output clock generating circuit for a semiconductor memory apparatus includes a rising data output clock generating unit which combines a rising clock with a signal to be generated in response to a rising output enable signal and a falling clock so as to generate a rising data output clock; and a falling data output clock generating unit which combines the falling clock with a signal to be generated in response to a falling output enable signal and the rising clock so as to generate a falling data output clock.

According to another embodiment of the present invention, a method of generating a data output clock for a semiconductor memory apparatus includes combining an output enable signal, which sets a clock period for data output, and a first clock to generate first and second signals, causing the first and second signals to be input to a flip-flop to generate a third signal, an enable time of which is controlled by the first signal and a disable time of which is controlled by the second signal, and combining the third signal and a second clock to generate a data output clock.

DESCRIPTION OF EXEMPLARY EMBODIMENT

An embodiment of the present invention will now be described in detail with reference to the accompanying drawings.

Figure 1:
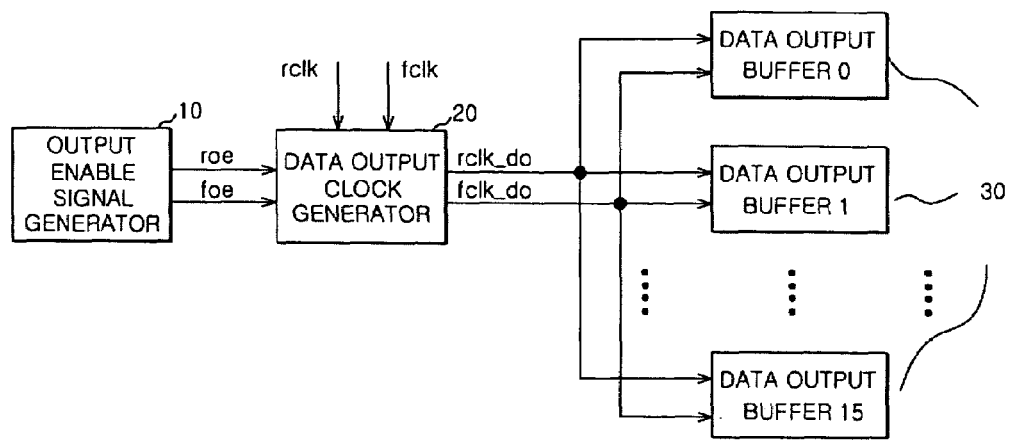
FIG. 1 is a block diagram illustrating a data output process of a known semiconductor memory apparatus.
Figure 2:
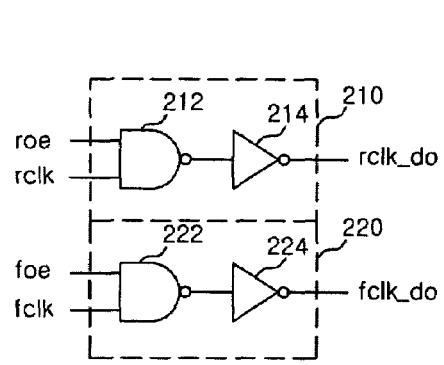
FIG. 2 is a diagram showing an internal configuration of a data output clock generator shown in FIG. 1.
Figure 3:
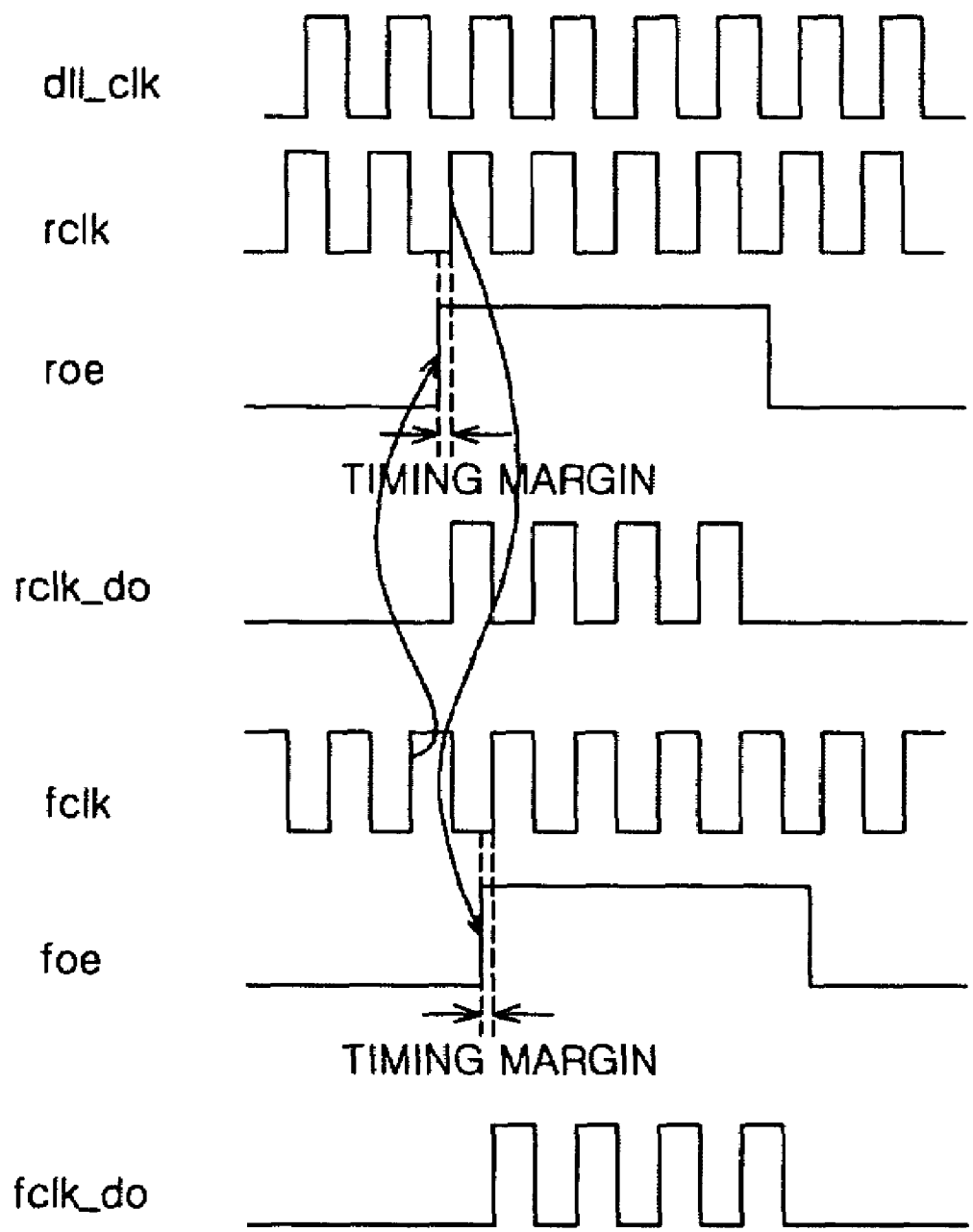
FIG. 3 is a timing diagram illustrating a data output process in a semiconductor memory apparatus according to the related art.
Figure 4:
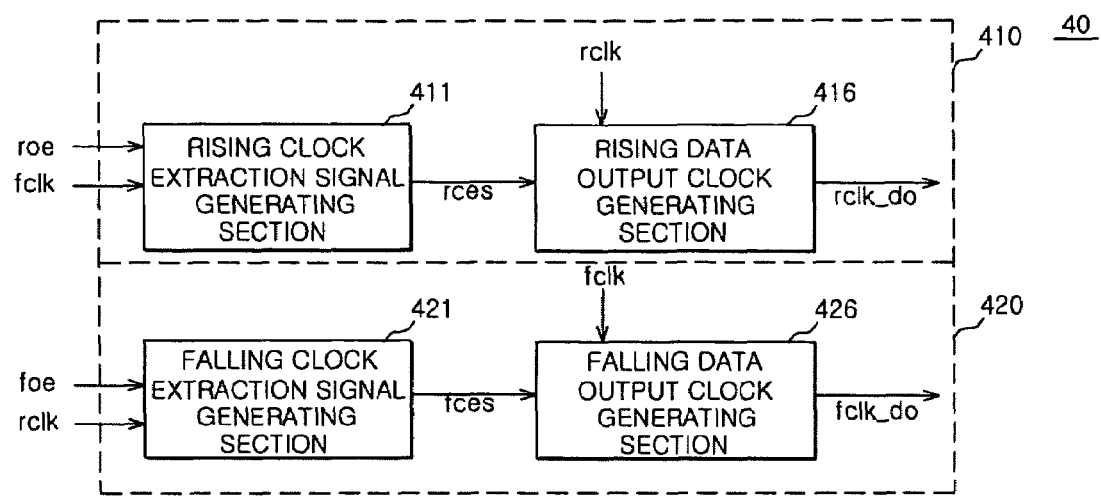
FIG. 4 is a block diagram showing a configuration of a data output clock generating circuit for a semiconductor memory apparatus according to an embodiment of the present invention.

FIG. 4 is a block diagram showing the configuration of a data output clock generating circuit for a semiconductor memory apparatus according to an embodiment of the present invention.

As shown in FIG. 4, a data output clock generating circuit 40 according to an embodiment of the present invention includes a rising data output clock generating unit 410 which receives a rising output enable signal roe, a falling clock fclk, and a rising clock rclk to generate a rising data output clock rclk_do, and a falling data output clock generating unit 420 which receives a falling output enable signal foe, the rising clock rclk, and the falling clock fclk to generate a falling data output clock fclk_do.

The rising data output clock generating unit 410 includes a rising clock extraction signal generating section 411 which receives the rising output enable signal roe and the falling clock fclk and generates a rising clock extraction signal rces. The rising clock extraction signal rces is enabled at a time of the first rising edge of the falling clock fclk after the rising output enable signal roe is enabled and is disabled at a time of the first rising edge of the falling clock fclk after the rising output enable signal roe is disabled. A rising data output clock generating section 416 receives the rising clock extraction signal rces and the rising clock rclk and extracts the rising clock rclk during a period when the rising clock extraction signal rces is enabled to generate and output the rising data output clock rclk_do.

The falling data output clock generating unit 420 includes a falling clock extraction signal generating section 421 which receives the falling output enable signal foe and the rising clock rclk and generates a falling clock extraction signal fces. The falling clock extraction signal fces is enabled at a time of the first rising edge of the rising clock rclk after the falling output enable signal foe is enabled and is disabled at a time of the first rising edge of the rising clock rclk after the falling output enable signal foe is disabled. A falling data output clock generating section 426 receives the falling clock extraction signal fces and the falling clock fclk and extracts the falling clock fclk during a period when the falling clock extraction signal fces is enabled to generate and output the falling data output clock fclk_do.

Figure 5:
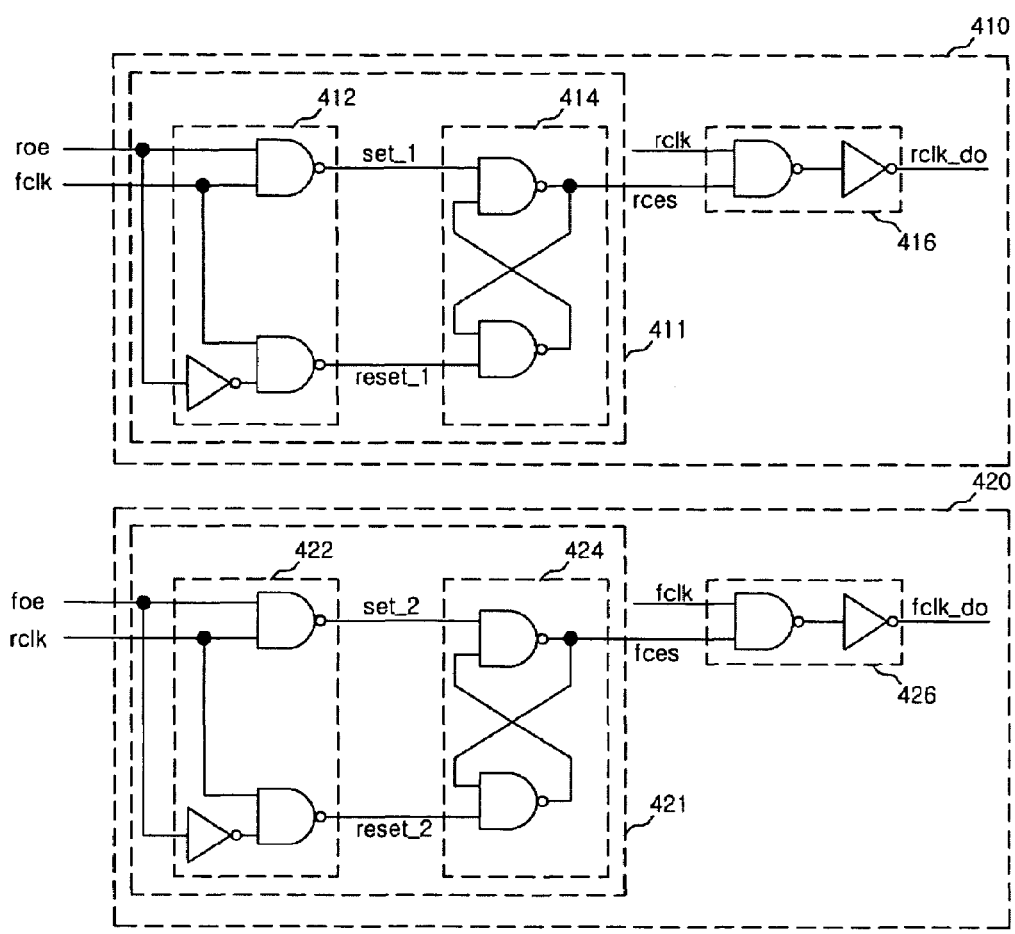
FIG. 5 is a diagram showing a detailed configuration of a data output clock generating circuit shown in FIG. 4.

FIG. 5 is a diagram showing a detailed configuration of the data output clock generating circuit shown in FIG. 4.

As shown in FIG. 5, in the data output clock generating circuit 40, the rising clock extraction signal generating section 411 of the rising data output clock generating unit 410 includes a first input section 412 which receives the rising output enable signal roe and the falling clock fclk and generates a first set signal set_1 and a first reset signal reset_1, and a first flip-flop 414 which receives the first set signal set_1 and the first reset signal reset_1 and generates the rising clock extraction signal rces.

The falling clock extraction signal generating section 421 of the falling data output generating unit 420 includes a second input section 422 which receives the falling output enable signal foe and the rising clock rclk and generates a second set signal set_2 and a second reset signal reset_2, and a second flip-flop 424 which receives the second set signal set_2 and the second reset signal reset_2 and generates the falling clock extraction signal fces.

The first set signal set_1 obtained by inputting the rising output enable signal roe and the falling clock fclk into a NAND gate. Furthermore, the first reset signal reset_1 is obtained by inverting the rising output enable signal roe through an inverter and inputting the inverted rising output enable signal and the falling clock fclk into a NAND gate.

The second set signal set_2 is obtained by inputting the falling output enable signal foe and the rising clock rclk into a NAND gate. Furthermore, the second reset signal reset_2 is obtained by inverting the falling output enable signal foe through an inverter and inputting the inverted falling output enable signal and the rising clock rclk into a NAND gate.

The rising clock extraction signal rces is enabled at a time of the first falling edge of the first set signal set_1 and is disabled at a time of a falling edge of the first reset signal reset_1 after the first set signal set_1 is fixed to a high level. The falling clock extraction signal fces is enabled at a time of the first falling edge of the second set signal set_2 and is disabled at a time of a falling edge of the second reset signal reset_2 after the second set signal set_2 is fixed to a high level.

The rising data output clock rclk_do is a clock signal obtained by inputting the rising clock extraction signal rces and the rising clock rclk into a NAND gate and an inverter connected in series and extracting a common high-level period between them. Similarly, the falling data output clock fclk_do is a clock signal obtained by inputting the falling clock extraction signal fces and the falling clock fclk into a NAND gate and an inverter connected in series and extracting a common high-level period between them.

If the rising output enable signal roe and the falling clock fclk are input to the first input section 412 of the rising data output clock generating unit 410, the first set signal set_1 and the first reset signal reset_1 are generated, and then the rising clock extraction signal rces is generated through the first flip-flop 414. The rising data output clock generating section 416 generates the rising data output clock rclk_do from the rising clock extraction signal rces and the rising clock rclk. At this time, the rising clock extraction signal rces serves as a signal for ensuring a predetermined timing margin relative to the rising clock rclk.

Similarly, if the falling output enable signal foe and the rising clock rclk are input to the second input section 422 of the falling data output clock generating unit 420, the second set signal set_2 and the second reset signal reset_2 are generated, and then the falling clock extraction signal fces is generated through the second flip-flop 424. The falling data output clock generating section 426 generates the falling data output clock fclk_do from the falling clock extraction signal fces and the falling clock fclk. At this time, the falling clock extraction signal fces serves as a signal for ensuring a predetermined timing margin relative to the falling clock fclk.

Figure 6:
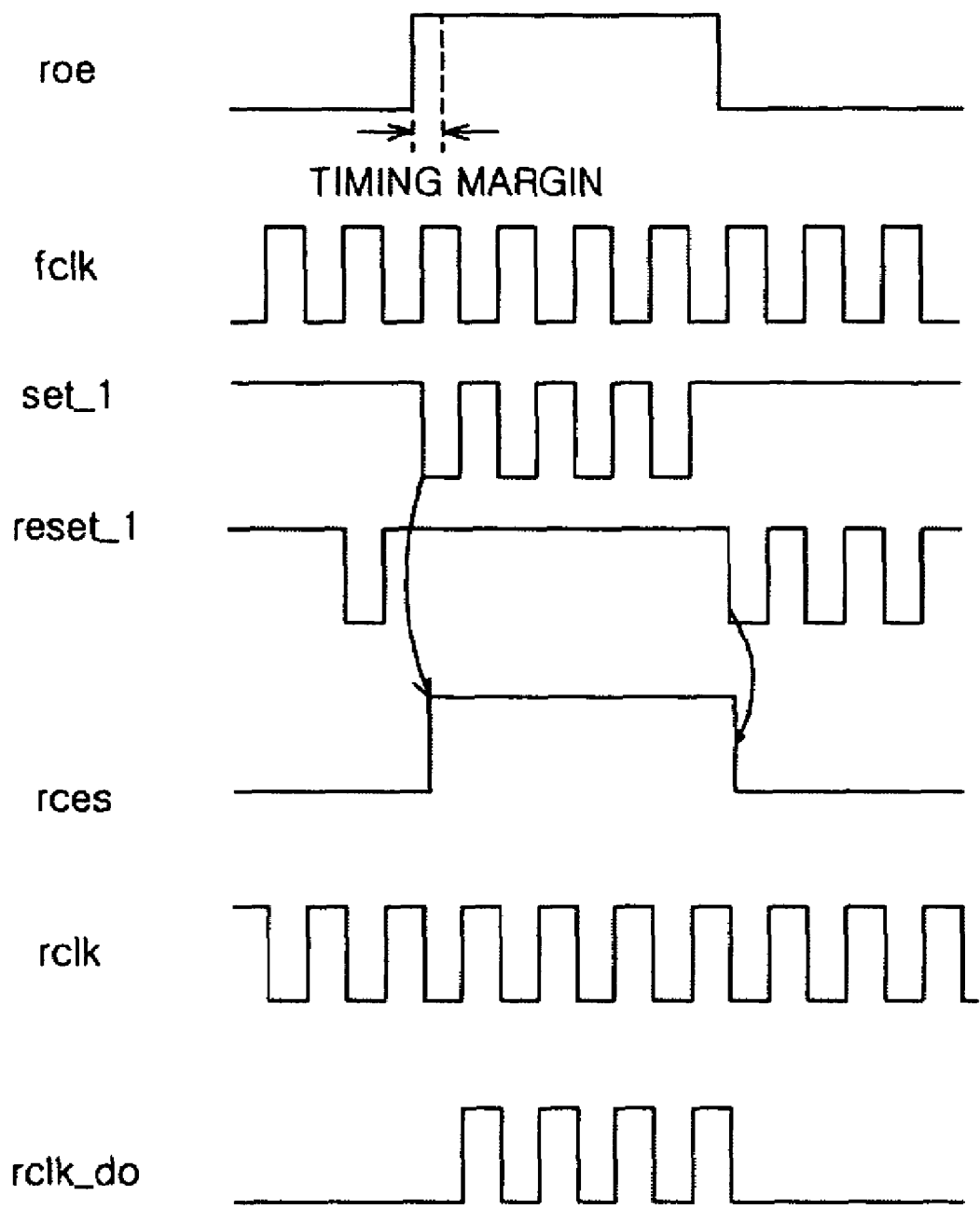
FIG. 6 is a timing diagram illustrating a data output process in a semiconductor memory apparatus according to an embodiment of the present invention.

FIG. 6 is a timing diagram illustrating a data output process in a semiconductor memory apparatus according to an embodiment of the present invention. FIG. 6 shows only a process of generating the rising data output clock. A process of generating the falling data output clock is similar to the process of generating the rising data output clock. Therefore, the same description is applied to the process of generating the falling data output clock.

FIG. 6 shows the first set signal set_1 and the first reset signal reset_1 generated by the first input section 412 of the rising data output clock generating unit 410 based on of the rising output enable signal roe and the falling clock fclk. The rising clock extraction signal rces is enabled at the time of the first falling edge of the first set signal set_1. Then, after the first set signal set_1 is fixed to a high level, the rising clock extraction signal rces is disabled at the time of the first falling edge of the first reset signal reset_1. Next, the rising clock rclk corresponding to the period the rising clock extraction signal rces is enabled, is extracted and output as the rising data is output clock rclk_do.

In a high-speed semiconductor memory apparatus, when the width of the rising output enable signal roe is narrowed due to the use of a DLL clock dll_clk having a high frequency, and then the rising output enable signal roe is enabled in the high-level period of the falling clock fclk, the time of the first falling edge of the first set signal set_1 is delayed. Thus an enable start time of the rising clock extraction signal rces is delayed. However, since the rising clock extraction signal rces is a signal which begins to be enabled at the time of the first falling edge of the first set signal set_1, and the rising clock rclk is a clock, the time of the rising edge of which is set after a half cycle of the time of the first falling edge of the first set signal set_1, a timing margin of a predetermined time to the rising clock rclk and the rising clock extraction signal rces is ensured by the rising clock extraction signal rces. Therefore, even though the rising clock extraction signal rces is delayed, there is no effect on a common high-level region of the rising clock extraction signal rces and the rising clock rclk. As a result, the final output rising data output clock rclk_do is reliably generated, and thus data having the prescribed number of bits can be output even though the high-frequency DLL clock is used.

Similarly, the falling data output clock fclk_do is also reliably generated since a timing margin relative to the falling clock fclk is ensured by the falling clock extraction signal fces.

It will be apparent to those skilled in the art that various modifications and changes may be made without departing from the scope and spirit of the present invention. Therefore, it should be understood that the above embodiments are not limiting, but illustrative in all aspects. The present invention should be construed broadly within its spirit and scope as defined in the appended claims, and therefore all changes and modifications that fall within the metes and bounds of the claims, or the equivalents of such metes and bounds are therefore intended to be embraced by the appended claims.

As described above, according to the data output clock generating circuit and the method of generating a data output clock for a semiconductor memory apparatus according to the disclosed embodiment of the present invention, the timing margin between the rising output enable signal and the rising clock and the timing margin between the falling output enable signal and the falling clock when data is output are increased. Therefore, the rising data output clock and the falling data output clock which are used for the data output operation can be reliably generated.

What is claimed is:

1. A data output clock generating circuit for a semiconductor memory apparatus, comprising:
   a rising data output clock generating unit configured to combine a rising clock with a rising clock extraction signal generated in response to a rising output enable signal and a falling clock to generate a rising data output clock wherein the rising data output clock generating unit includes:
   a rising clock extraction signal generating section receiving the rising output enable signal and the falling clock and generating the rising clock extraction signal, the rising clock extraction signal being enabled at a time of a first rising edge of the falling clock after the rising output enable signal is enabled and being disabled at a time of a first rising edge of the falling clock after the rising output enable signal is disabled; and a rising data output clock generating section receiving the rising clock extraction signal and the rising clock and extracting the rising clock during a period when the rising clock extraction signal is enabled to generate and output the rising data output clock; and a falling data output clock generating unit configured to combine the falling clock with a falling clock extraction signal generated in response to a falling output enable signal and the rising clock to generate a falling data output clock wherein the rising data output clock generating unit and the falling data output clock generating unit are independently driven in parallel.

2. The data output clock generating circuit of claim 1, wherein the rising clock extraction signal generating section includes:
an input section receiving the rising output enable signal and the falling clock and generating a set signal and a reset signal, and
a flip-flop receiving the set signal and the reset signal and generating the rising clock extraction signal.

3. The data output clock generating circuit of claim 2, wherein the input section comprises:
a NAND gate receiving the rising output enable signal and the falling clock as input and outputting the set signal.

4. The data output clock generating circuit of claim 2, wherein the input section comprises:
an inverter inverting the rising output enable signal and a NAND gate receiving the inverted rising output enable signal and the falling clock as input and outputting the reset signal.

5. The data output clock generating circuit of claim 2, wherein the rising clock extraction signal is enabled at a time of a first falling edge of the set signal and is disabled at a time of a falling edge of the reset signal after the set signal is fixed to a high level.

6. The data output clock generating circuit of claim 1, wherein the rising data output clock generating section comprises:
a NAND gate and an inverter provided in series, the NAND gate having inputs receiving the rising clock extraction signal and the rising clock and the inverter outputting the rising data output clock.

7. The data output clock generating circuit of claim 1, wherein the falling data output clock generating unit includes:
a falling clock extraction signal generating section receiving the falling output enable signal and the rising clock and generating the falling clock extraction signal, the falling clock extraction signal being enabled at a time of a first rising edge time of the rising clock after the falling output enable signal is enabled and being disabled at a time of a first rising edge time of the rising clock after the falling output enable signal is disabled, and
a falling data output clock generating section receiving the falling clock extraction signal and the falling clock and extracting the falling clock during a period when the falling clock extraction signal is enabled to generate and output the falling data output clock.

8. The data output clock generating circuit of claim 7, wherein the falling clock extraction signal generating section includes:
an input section receiving the falling output enable signal and the rising clock and generating a set signal and a reset signal, and
a flip-flop receiving the set signal and the reset signal and generating the falling clock extraction signal.

9. The data output clock generating circuit of claim 8, wherein the falling clock extraction signal is enabled at a time of a first falling edge of the set signal and is disabled at a time of a falling edge of the reset signal after the set signal is fixed to a high level.

10. The data output clock generating circuit of claim 7, wherein the input section comprises:
a NAND gate receiving the falling output enable signal and the rising clock as input and outputting the set signal.

11. The data output clock generating circuit of claim 7, wherein the input section comprises:
an inverter inverting the falling output enable signal and a NAND gate receiving the inverted falling output enable signal and the rising clock as input and outputting the reset signal.

12. The data output clock generating circuit of claim 7, wherein the falling data output generation section comprises a NAND gate and an inverter provided in series, the NAND gate having inputs receiving the falling clock extraction signal and the falling clock and the inverter having an output outputting falling data output clock.

* * * * *